United States Patent
Mons et al.

(10) Patent No.: US 10,556,682 B2
(45) Date of Patent: Feb. 11, 2020

(54) RETURN DEVICE FOR RETRACTING A MOVABLE ATTACHMENT DEVICE, AND AN AIRCRAFT FITTED WITH SUCH A RETURN DEVICE

(71) Applicant: AIRBUS HELICOPTERS, Marignane (FR)

(72) Inventors: Pierre Mons, Aix en Provence (FR); Florian Jimenez, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 380 days.

(21) Appl. No.: 15/471,253

(22) Filed: Mar. 28, 2017

(65) Prior Publication Data
US 2017/0283056 A1    Oct. 5, 2017

(30) Foreign Application Priority Data
Mar. 30, 2016    (FR) ...................................... 16 00527

(51) Int. Cl.
*B64D 1/22*    (2006.01)
*F16H 19/08*    (2006.01)
*F16H 25/18*    (2006.01)

(52) U.S. Cl.
CPC ............... *B64D 1/22* (2013.01); *F16H 19/08* (2013.01); *F16H 25/18* (2013.01); *F16H 2019/085* (2013.01)

(58) Field of Classification Search
CPC .... B64C 1/22; B64D 1/22; B66D 3/06; B66D 3/08
See application file for complete search history.

(56) References Cited

U.S. PATENT DOCUMENTS

| | | | |
|---|---|---|---|
| 3,044,818 | A | 7/1962 | Tobey |
| 3,265,336 | A | 8/1966 | Peterson |
| 9,340,285 | B2 | 5/2016 | Prud'Homme-Lacroix et al. |
| 2015/0014485 | A1* | 1/2015 | Prud'Homme-Lacroix ................ B64C 1/22 244/137.4 |

FOREIGN PATENT DOCUMENTS

FR    3008385    1/2015

OTHER PUBLICATIONS

French Search Report for French Application No. FR 1600527, Completed by the French Patent Office on Nov. 18, 2016, 6 Pages.

* cited by examiner

*Primary Examiner* — Philip J Bonzell
*Assistant Examiner* — Tye William Abell
(74) *Attorney, Agent, or Firm* — Brooks Kushman P.C.

(57) ABSTRACT

A return device for retracting an attachment device of an aircraft. The attachment device is movable between a retracted storage position and a deployed working position, the return device tending to place the attachment device in the retracted storage position in the absence of an external load, while allowing the attachment device to move towards the deployed working position in the presence of an external load. The return device comprises resilient return means for exerting a traction return force on the attachment device and automatically bringing the attachment device into the retracted storage position; a force-reduction member for reducing the traction return force exerted by the resilient return means on the attachment device; and a line element having a first free end secured to the attachment device and a second free end secured to the force-reduction member.

20 Claims, 4 Drawing Sheets

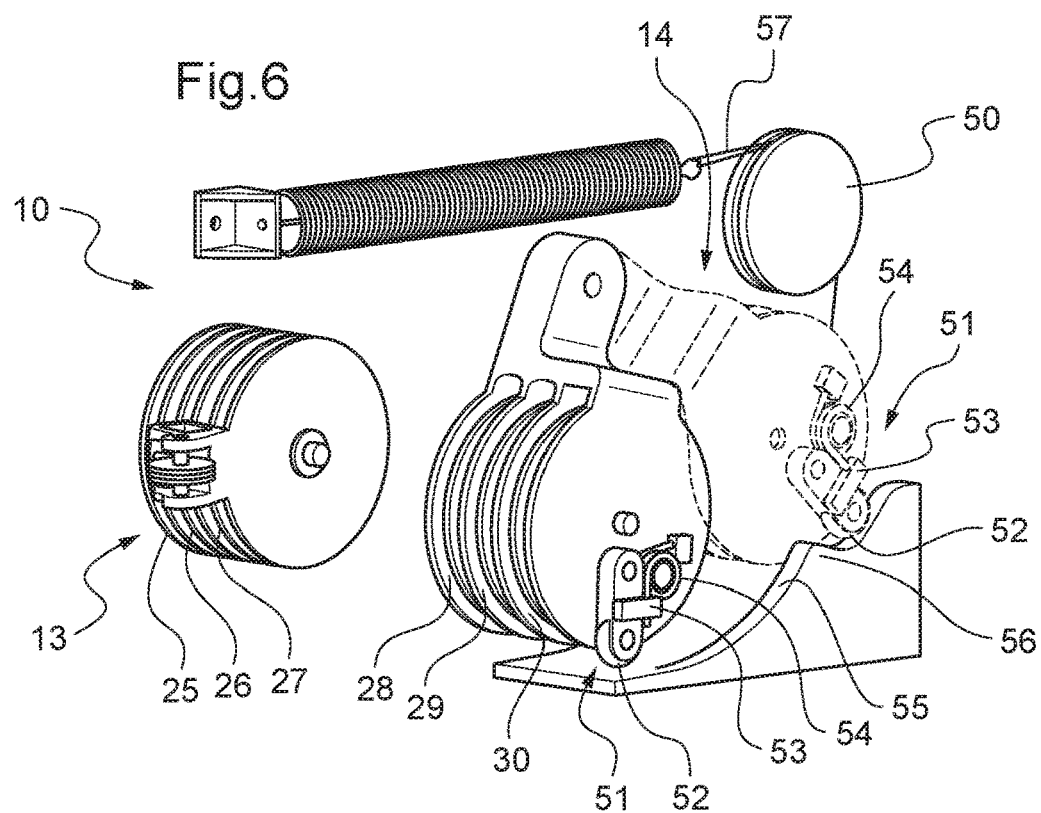
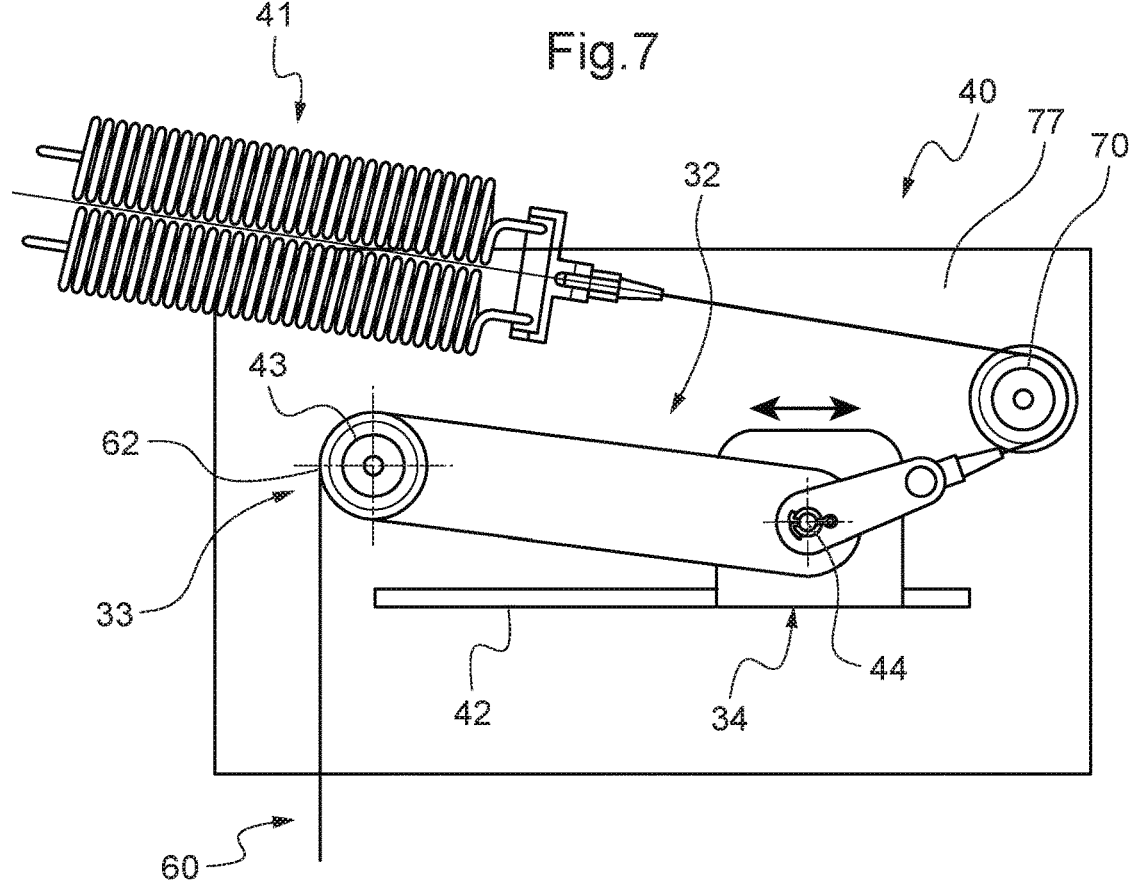

RETURN DEVICE FOR RETRACTING A MOVABLE ATTACHMENT DEVICE, AND AN AIRCRAFT FITTED WITH SUCH A RETURN DEVICE

CROSS-REFERENCE TO RELATED APPLICATIONS

This application claims priority to French patent application No. FR 16 00527 filed on Mar. 30, 2016, the disclosure of which is incorporated in its entirety by reference herein.

BACKGROUND OF THE INVENTION (1) Field of the Invention

The present invention relates to a return device for retracting a movable attachment device that enables an aircraft fitted with the attachment device to carry an external load.

The technical field of the invention is thus the field of systems that enable an external load to be fastened to an aircraft, and in particular to an aircraft having a rotary wing such as a rotorcraft or a helicopter.

(2) Description of Related Art

Conventionally, an aircraft has a structure referred to for convenience as a "carrier structure" for carrying an external load that is independent of the aircraft. The carrier structure may comprise frames secured to the fuselage of the aircraft, a covering, or indeed a transport snub wing.

The aircraft can then be provided with an attachment device connected to the carrier structure for carrying an external load. Generally, such an attachment device is attached under the carrier structure of the aircraft.

By way of example, the attachment device may be provided with hook-type attachment means. A sling is then attached to the hook in order to make it possible to transport external load.

The attachment device may also include a fastener device for suspending the attachment means from the carrier structure. The fastener device may be:

a first fastener device known as a "sling", which first device is of the universal joint type having two mutually orthogonal pivot axes;

a second fastener device known as a "swing": the second device comprising a pyramid-shaped frame suspended from the carrier structure, e.g. by suspension cables known as "pendants"; or a third fastener device making use of a beam to which the hook is attached, the beam generally being fastened to the carrier structure at at least two points.

By way of example, Document U.S. Pat. No. 3,044,818 describes a fastener device having a pyramid-shaped frame. The pyramid-shaped frame may comprise a base having three or four sides, with bars rising from the base towards a top of the frame. The attachment means are situated under an opening provided in a fuselage.

On an aircraft having a lift rotor, the attachment device is advantageously arranged close to the rotor axis of the lift rotor so as to limit the attachment device generating disturbances to the behavior in flight of the aircraft and thus to piloting it. In the same manner, the fuel tanks of an aircraft may also be arranged in the proximity of the rotor axis. Consequently, in flight, an attachment device may be situated under a tank of the aircraft.

Under such circumstances, the aircraft may include a return device tending to move the attachment device away from the tanks in the absence of an external load, or away from any other member that needs to be protected. Thus, the return device tends to avoid any risk of a sensitive member of the aircraft being punctured by the attachment device in the event of a crash.

Such a return device may comprise at least one resilient return means exerting a return force in order to move the attachment device away from a sensitive zone in the absence of an external load. The resilient return means may be of the bungee cord type, and may for example be connected to the fastener device carrying the attachment means.

When an operator suspends an external load from the attachment device, the resilient return means then tend to stretch. The external load together with the attachment device thus tend to become vertically aligned under the effect of gravity, being positioned in a position that is referred to for convenience as the "working" position.

In contrast, when the external load is removed, the resilient return means can retract so as to move the attachment device away from the working position so as to position the attachment device in a position that is referred to for convenience as the "storage" position. By way of example, the storage position is selected so as to limit any risk of a fuel tank being punctured by the attachment device in the event of the aircraft crashing.

The resilient return means exert a large return force on the fastener device in order to hold it in the storage position in spite of the accelerations to which the aircraft can be subjected during a mission. The return force also increases as a function of the amount of stretching of the resilient return means, and thus of the external load being carried and also of the forward speed and/or the acceleration of the aircraft.

Under such circumstances, the return force is large in order to hold the attachment device in the storage position. This return force is even greater when a load is present, since the resilient return means are then in a stretched position. Under such circumstances, the resilient return means can disturb the balance of the external load carried in the working position by generating a return force that is not negligible.

Furthermore, when the external load is released, the return force leads to the attachment device returning suddenly and quickly to the storage position. Abutments may be installed to avoid an impact against the carrier structure. Nevertheless, repeated sudden returns of the fastener device can end up weakening such abutments. Furthermore, since the return force is large, the attachment device is subjected to acceleration that is likewise large and is returned so as to reach its storage position at high speed. This process requires the abutment system to be capable of absorbing the energy that corresponds to this high impact speed.

In addition, in order to fasten an external load, an operator needs to exert a considerable traction force on the attachment device so as to combat the return force exerted by the resilient return means. The further the operator moves the attachment device away from its storage position, the greater the force that the operator needs to deliver.

To remedy those drawbacks, it is possible to use return means that extend over a long length so as to maximize the amount of stretching they can accept in the elastic range.

Attachment devices may include dampers, blocking means, or indeed devices that are activated as a function of the position of the fastener device.

Document U.S. Pat. No. 3,044,818 describes an attachment device having a fastener device with a pyramid-shaped frame. The pyramid-shaped frame may have a base with three or four sides, together with bars rising from the base to a top of the frame. The attachment means are situated under an opening arranged in a fuselage.

Document U.S. Pat. No. 3,265,336 describes an attachment device forming a flexible pyramid-shaped structure having a cable and a plurality of pulleys. Such an attachment device is nevertheless constantly arranged under the fuselage of an aircraft and can not be retracted.

Document FR 3 008 385 describes an aircraft having an attachment device and a return device for retracting the attachment device. That attachment device includes an attachment member suitable for carrying a load. The return device includes resilient return means and a force-reduction member provided with a plurality of bars hinged together in pairs to form lever arms and to apply a non-linear force to the attachment device. Furthermore, the return device includes a tie connecting the force-reduction member to the attachment device, and the resilient return means are formed by a spring that is fastened at one of its ends to a bar of the force-reduction member and that is connected to an aircraft at another end.

In the storage position, the force-reduction member is unfolded so as to form a maximum angle (200) between the various lever arms. The force-reduction member thus enables a large force to be exerted on the tie and thus on the attachment device.

In contrast, in the working position, the force-reduction member is folded up so as to form a minimum angle (200) between the various lever arms. The force-reduction member thus enables a smaller force to be exerted on the tie and thus on the attachment device.

Consequently, the return device exerts a force on the attachment device that is at a maximum when the force-reduction member is unfolded. That force enables the attachment device to be held in its retracted storage position in spite of the high accelerations that can be generated during flight of the aircraft.

Conversely, the return device exerts a force on the attachment device that is reduced when the force-reduction member is folded up. Under such circumstances, the return device has a limited effect on the attachment device in the deployed working position.

Furthermore, the variation in the return force on going from a retracted storage position of the attachment device to a working position does not vary linearly. On the contrary, the return force decreases very quickly from the retracted storage position going towards a minimum value. Under such circumstances, the force that an operator needs to deliver in order to oppose the return force when manipulating the attachment device is significant above all when the attachment device is in its retracted storage position.

Finally, the force-reduction member leads to a reduced retraction speed for the movement of the attachment device from the deployed working position to the retracted storage position.

BRIEF SUMMARY OF THE INVENTION

The present invention thus provides a return device for retracting an attachment device of an aircraft, such an attachment device being movable between a retracted storage position POS1 and a deployed working position POS2. Such a return device tends to place the attachment device in the retracted storage position POS1 in the absence of an external load, while allowing the attachment device to move towards the deployed working position POS2 in the presence of an external load.

In addition, such a return device comprises:
  resilient return means for exerting a traction return force on the attachment device and automatically bringing the attachment device into the retracted storage position POS1;
  a force-reduction member for reducing the traction return force exerted by the resilient return means on the attachment device; and
  a line element having a first free end secured to the attachment device and a second free end secured to the force-reduction member.

In other words, such a force-reduction member enables the size and/or its stiffness of the resilient return means to be limited while enabling the attachment device to be returned quickly to the retracted storage position, and while also holding the attachment device in this retracted storage position during accelerations that are generated in flight as a function of the paths followed by the aircraft.

The resilient return means are advantageously formed by a coil spring that is stressed in traction. In addition, the traction force delivered by such resilient return means increases when the attachment device is moved away from its retracted storage position.

Furthermore, and by way of example, the line element may consist of a stainless steel cable and may have a diameter of less than 10 millimeters, and preferably of less than 5 millimeters.

According to the invention, the force-reduction member is remarkable in that it comprises a pulley block that is stationary relative to a support structure of the return device and a pulley block that is movable relative to the support structure of the return device, each of the stationary and movable pulley blocks having at least two independent pulleys, each having a degree of freedom to move in rotation, the at least two pulleys of the stationary pulley block being free to move in rotation about a first axis of rotation, and the at least two pulleys of the movable pulley block being free to move in rotation about a second axis of rotation, the first and second axes of rotation being parallel to each other, the at least two pulleys of the stationary pulley block and the at least two pulleys of the movable pulley block enabling the line element to be wound over the at least four pulleys so as to form at least two go paths and two return paths between the stationary and movable pulley blocks.

In other words, the force-reduction member operates on the principle of a block and tackle in which the traction return force exerted by the resilient return means is transmitted to the movable pulley block and reduced by the number of go-and-return paths of the line element between the stationary and movable pulley blocks.

this way, the force-reduction member makes it possible to use resilient return means of limited size and weight. Such resilient return means can thus generate a return stroke that is relatively small and that is then increased by the force-reduction member in order to oppose accelerations of the aircraft, in particular.

In practice, the second free end of the line element may be secured to the movable pulley block.

Under such circumstances, the line element enters into the force-reduction member via the stationary pulley block and then follows three go paths and two return paths between the stationary pulley block and the movable pulley block. The line element is then secured at its second free end to the movable pulley block.

Furthermore, the movable pulley block can be free to move with various degrees of freedom relative to the support structure of the return device. Such a movable pulley block can then follow various movements or paths that are directly associated with the movements of the second axis of rotation of the pulleys of the movable pulley block, the second axis of rotation being moved away from or towards the first axis of rotation of the pulleys of the stationary pulley block during the movement of the attachment device between the retracted storage position and the deployed working position. Consequently, and for greater clarity, the movements followed by the movable pulley block relative to the support structure of the return device can be defined by the movements of the second axis of rotation of the pulleys of the movable pulley block relative to the support structure of the return device.

Thus, in a first embodiment, the second axis of rotation of the movable pulley block may be suitable for pivoting relative to the support structure of the return device, the movable pulley block forming a lever that pivots relative to the support structure of the return device about a third axis of rotation, such a third axis of rotation being arranged parallel to the first and second axes of rotation of the stationary and movable pulley blocks respectively.

Under such circumstances, the movable pulley block possesses a degree of freedom to move in rotation relative to the support structure of the return device, this movement in rotation taking place about the third axis of rotation. The pulleys positioned in the movable pulley block thus follow a circularly-arcuate path during the movement of the attachment device between the retracted storage position and the deployed working position.

In a second embodiment, the second axis of rotation of the movable pulley block may be suitable for sliding relative to the support structure of the return device in a sliding direction that is perpendicular to the first and second axes of rotation of the stationary and movable pulley blocks respectively.

In this other embodiment, the movable pulley block possesses a degree of freedom to move in translation relative to the support structure of the return device, this movement in translation taking place along the sliding direction. The pulleys positioned in the movable pulley block then follow a rectilinear path during the movement of the attachment device between the retracted storage position and the deployed working position.

Advantageously, the force-reduction member may have a force reduction ratio lying in the range 2 to 10.

In this way, the traction force transmitted to the attachment device for retracting it is two to ten times smaller than the traction force supplied by the resilient return means. Such a force-reduction ratio thus makes it possible to reduce the size and the weight of the resilient return means.

In practice, the return device may include at least one guide pulley and a strap to enable said resilient return means to deform by lengthening along a direction for which the orthogonal projection onto a midplane of symmetry of the aircraft is oppositely oriented relative to the orthogonal projection of a corresponding movement direction of the movable pulley block relative to the support structure of the return device.

Such an arrangement thus makes it possible to limit the size of the return device in a longitudinal direction of the aircraft corresponding to the direction of longitudinal travel of the attachment device.

A free end of the resilient return means is then secured to the strap passing via the guide pulley(s) prior to being secured to the movable pulley block. The strap and the guide pulley(s) thus serve to move the direction in which the traction force from the resilient return means acts either at or upstream from the force-reduction member in the longitudinal direction of the aircraft going from a front zone of the aircraft towards a rear zone of the aircraft.

Furthermore, the return device may include locking/unlocking means for the movable pulley block, the locking/unlocking means enabling the movable pulley block to be held stationary automatically in a locked position corresponding to the retracted storage position POS1 of the attachment device.

In other words, the locking/unlocking means make it possible to hold the movable pulley block in the locked position when no external load is attached to the attachment device. The locking/unlocking means are then adapted to detect the presence of an external load on the attachment device and then to release the movable pulley block automatically.

Advantageously, the locking/unlocking means may comprise:

a cam-follower wheel mounted on a rocker finger, the wheel being pivotally connected relative to the rocker finger and the rocker finger being pivotally connected relative to the movable pulley block;

a resilient return element for exerting a twisting return force on the rocker finger and automatically returning the rocker finger into a middle rest position when the movable pulley block is arranged in the locked position; and a cam ramp on which the cam-follower wheel runs during the movement of the movable pulley block relative to the support structure of the return device, the cam ramp being secured by an embedded type connection to the support structure of the return device and enabling a reaction force to be generated that acts on the rocker finger, the reaction force opposing the twisting return force exerted by the resilient return element on the rocker finger.

In other words, the locking/unlocking means also serve to damp or brake the movement of the movable pulley block during its retraction movement from a working position towards its locked position. Furthermore, it is by twisting stress in a first twisting direction of the resilient return element that the movement of the movable pulley block is damped/braked during the retraction of the resilient return means.

Specifically, the closer the movable pulley block comes to its locked position, the further the cam-follower wheel moves up the cam ramp, thereby turning the rocker finger relative to the movable pulley block. Thus, the twisting stress of the resilient return element increases, thereby having the effect of increasing the reaction force from the cam ramp on the wheel and thus increasing the damping or braking force from the support structure on the movable pulley block.

In addition, the locking/unlocking means may release the movable pulley block from the locked position when a traction force is exerted on the line element that is greater than a threshold value F1.

In other words, as soon as the traction force exerted on the line element is greater than the threshold value F1, the locking/unlocking means enable the movable pulley block to leave its locked position automatically. The traction force exerted on the line element is then greater than the traction force exerted by the resilient return means as reduced by the force-reduction member.

In addition, when the slope of the cam ramp is constant, the reaction force exerted by the cam ramp on the wheel and thus on the rocker finger can be linear.

Nevertheless, in practice, the cam ramp may include a varying degree of inclination enabling a non-linear reaction force to be generated that is exerted by the cam ramp on the rocker finger.

By way of example, this non-linearity thus makes it possible to increase the braking/damping force when the movable pulley block comes close to its locked position. Consequently, the travel speed of the movable pulley block can be considerable at the beginning of its stroke and can decrease progressively down to zero at the locked position.

Advantageously, the cam ramp may include a point of inflection for locally generating a maximum in the reaction force exerted by the cam ramp on the rocker finger.

At such a point of inflection, the slope of the cam ramp varies suddenly. Advantageously, the direction of the slope may also be reversed at the point of inflection so as to enable the rocker finger to pivot into its middle position when the movable pulley block is arranged in the locked position.

Without moving the movable pulley block from its locked position, the rocker finger then needs to be tilted in a direction opposite to that in which it was being turned during the braking/damping of the movable pulley block. The twist return element is then subjected to twisting stress in a direction opposite to that in which it is stressed during the braking/damping of the movable pulley block.

The present invention also provides an aircraft having an attachment device enabling said aircraft to transport an external load. Such an attachment device is movable between a retracted storage position POS1 and a deployed working position POS2.

According to the invention, such an aircraft is remarkable in that it includes a return device as described above for retracting the attachment device into the retracted storage position POS1 in the absence of an external load, while allowing the attachment device to move towards the deployed working position POS2 in the presence of an external load.

In other words, when the aircraft is a rotorcraft, for example, it has a return device for retracting an attachment device into the retracted storage position POS1 if the rotorcraft is not carrying any external load. Such a rotorcraft nevertheless also enables the attachment device to move automatically under the action of an external load into the deployed working position POS2, e.g. arranged substantially vertically below the axis of rotation of a main rotor of the rotorcraft.

BRIEF DESCRIPTION OF THE DRAWINGS

The invention and its advantages appear in greater detail from the context of the following description of embodiments given by way of illustration and with reference to the accompanying figures, in which:

FIG. 6 is a perspective view of the internal portions of the first embodiment of a return device that is also fitted with locking/unlocking means in accordance with the invention; and FIG. 7 is a view from beneath of the internal portions in a second embodiment of a return device for retracting the attachment device, in accordance with the invention.

Elements present in more than one of the figures are given the same references in each of them.

DETAILED DESCRIPTION OF THE INVENTION

Figure 1:
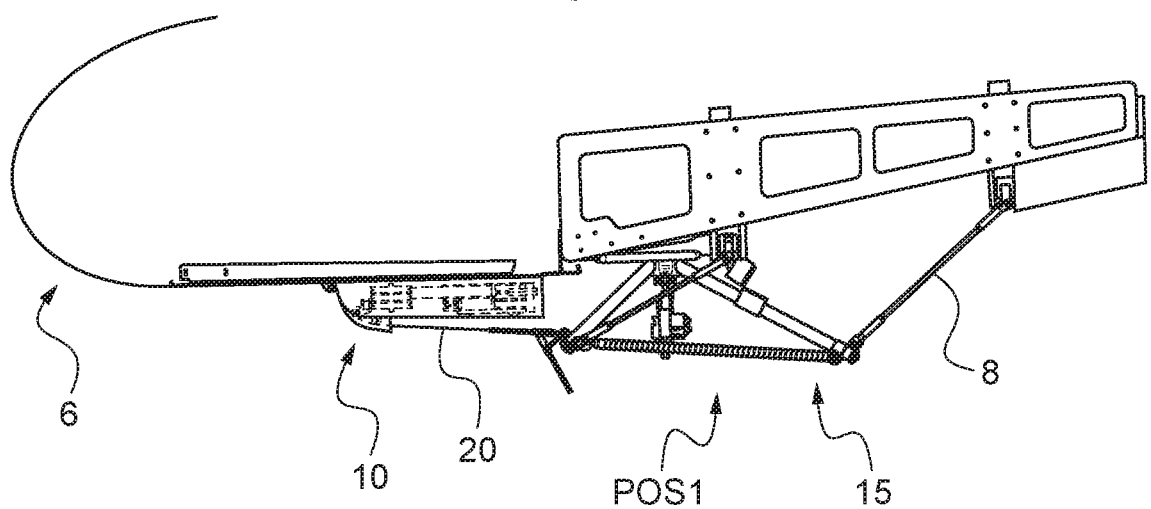
FIGS. 1 and 2 are side views shown the extreme positions of an aircraft attachment device.
Figure 2:
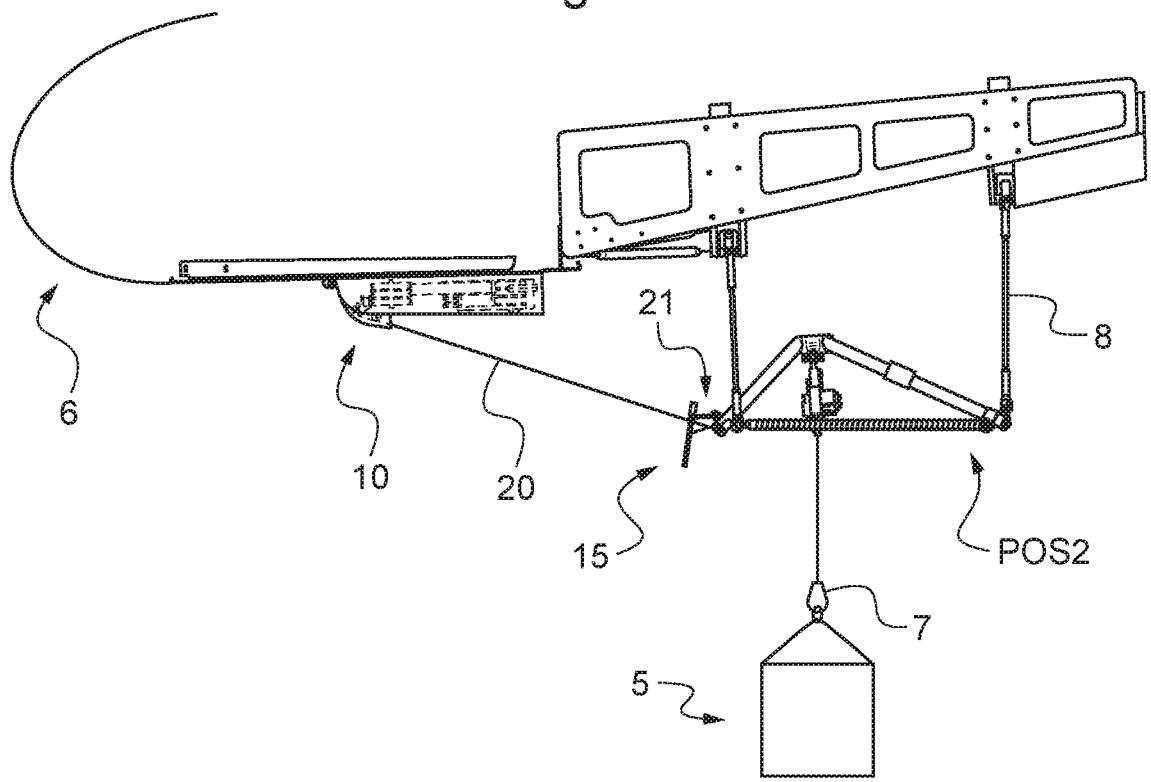

As mentioned above, the invention relates to an aircraft fitted with a return device for retracting an attachment device. As shown in FIGS. 1 and 2, such an aircraft 6 may be a rotorcraft, for example.

The return device 10 then serves to retract an attachment device 15 automatically into a retracted storage position POS1 when no external load 5 is fastened to the attachment device 15.

In contrast, when an external load 5 is secured to an attachment member 7, such as a hook or a snaphook, the attachment device 15 can deploy and move into a deployed working position POS2. Such retraction thus enables the attachment device 15 to be stowed in a zone remote from any member that is sensitive for the safety of the aircraft 6, such as for example a fuel tank. Thus, in the retracted rest position POS1, the pyramid shape of the frame of the attachment device 15 does not present any risk of puncturing the fuel tank.

The return device 10 includes a line element 20 having a first free end 21 secured of the attachment device 15. Such an attachment device is generally suspended by pendants 8 under the carrier structure of the aircraft 6.

Figure 3:
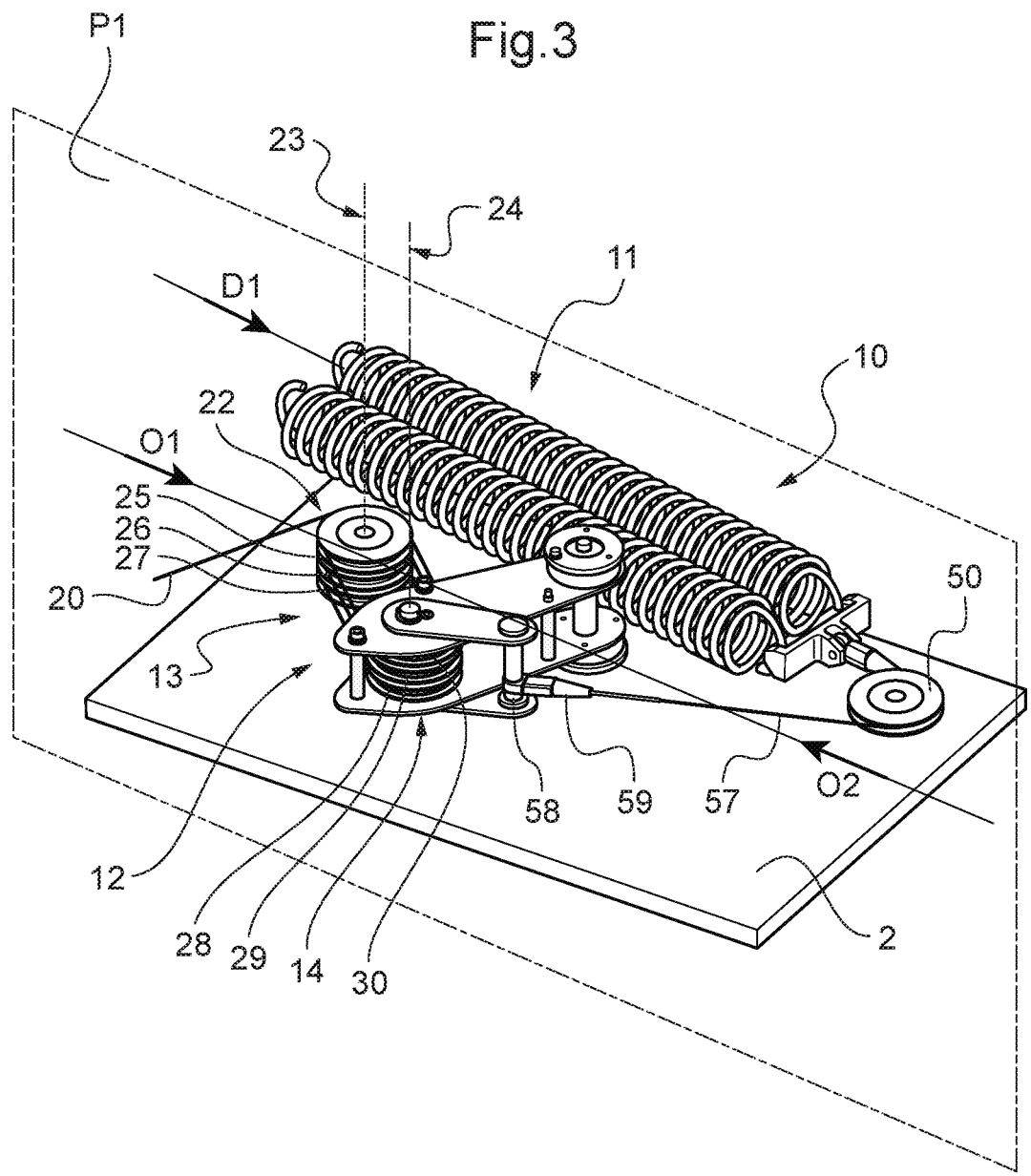
FIG. 3 is a perspective view of the internal portions in a first embodiment of a return device for retracting the attachment device in accordance with the invention.

As shown in FIG. 3, the return device 10 thus includes resilient return means 11, represented in this example in the form of two coil springs arranged in parallel to exert a traction return force on the attachment device 15. Naturally, a single coil spring could also perform this function.

The return device 10 also has a force-reduction member 12 for reducing the force generated by the resilient return means 11. Such force reduction members 12 thus make it possible to limit the size and the weight of the resilient return member 11.

As mentioned above, the return device 10 includes the line element 20 having its second free end 22 secured to the force-reduction member 12.

Such a force-reduction member 12 comprises a pulley block 13 that is stationary relative to a support structure 2 of the return device 10 and a pulley block 14 that is movable relative thereto. These stationary pulley block 13 and movable pulley block 14 are parts each forming an interface for reducing a traction force on the line element 20. Each of these pulley blocks serves to house at least two pulleys 25-27 and 28-30 that are free to move in rotation respectively about a first axis of rotation 23 and about a second axis of rotation 24. The line element 20 then runs along at least two go paths and two return paths between the at least four pulleys 25-30 of the force-reduction member 12, for which the reduction coefficient is directly a function of the number of go-and-return paths followed by the line element 20 between the stationary pulley block 13 and the movable pulley block 14.

Figure 4:
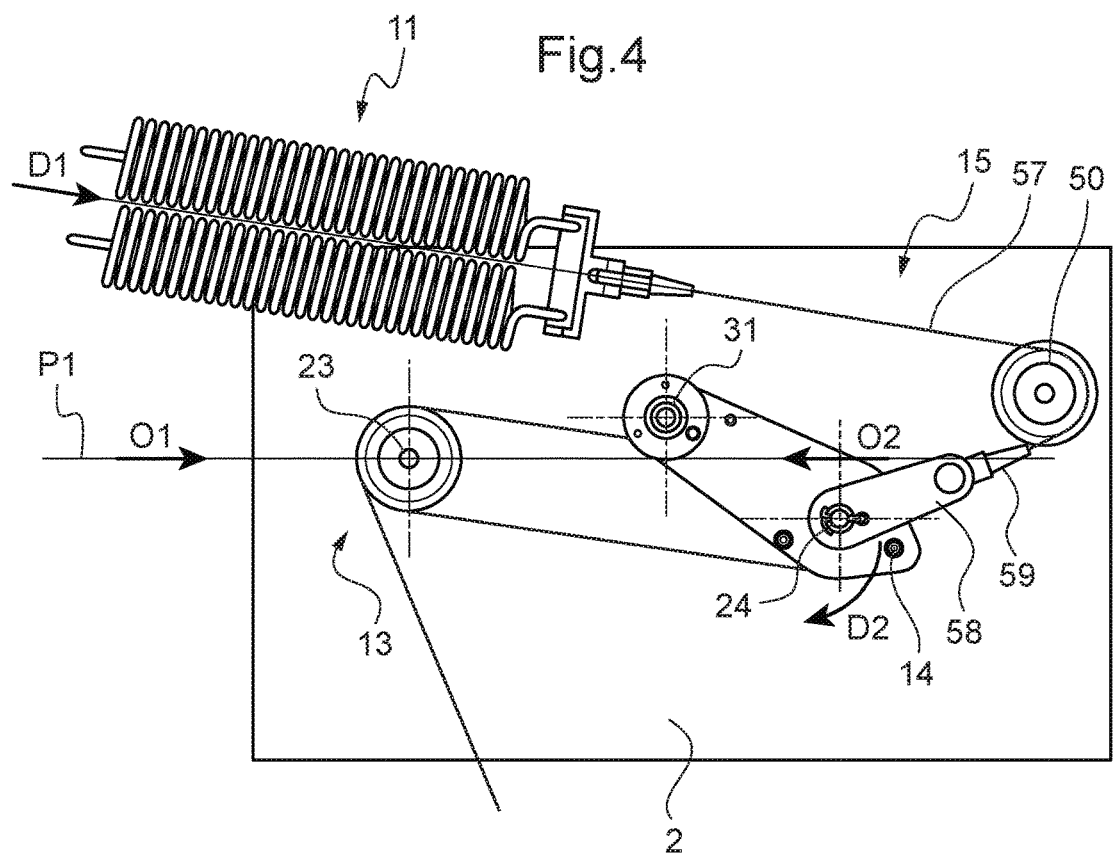
FIGS. 4 and 5 are views from beneath showing the extreme positions of the internal portions of the first embodiment of the return device.
Figure 5:
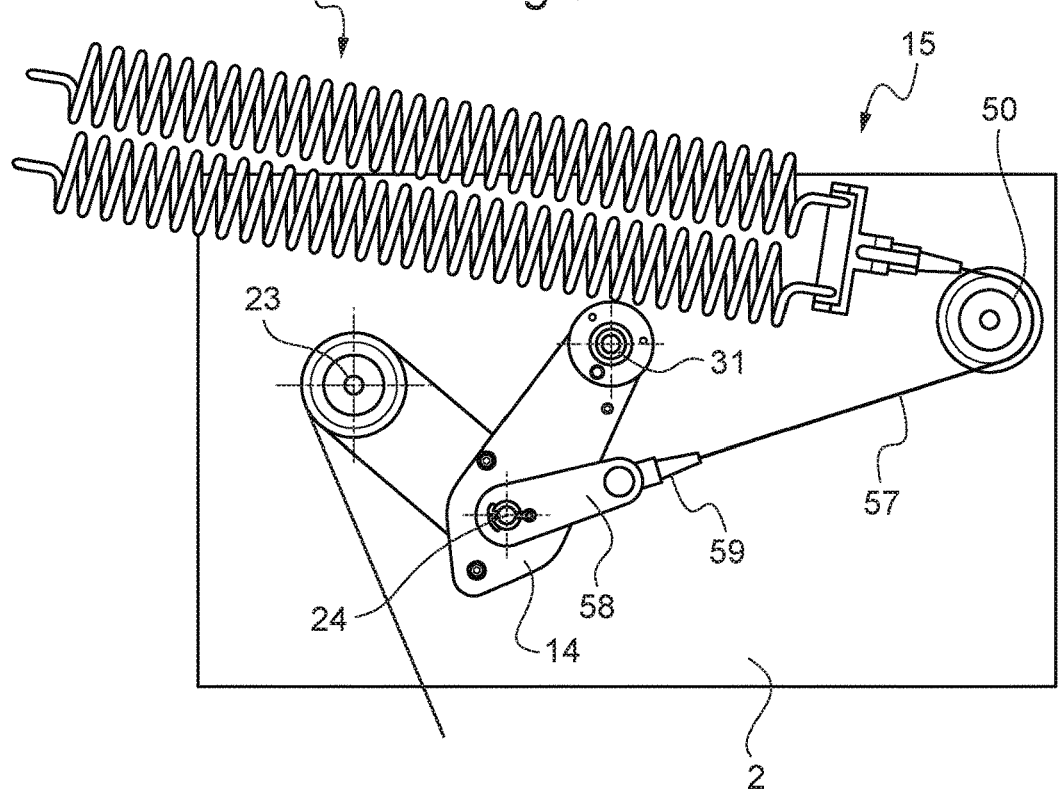

Thus, in a first embodiment as shown in FIGS. 3 to 6, the movable pulley block 14 may be formed by a lever that pivots about a third axis of rotation 31. The extreme positions of the movable pulley block 14 are shown in FIGS. 4 and 5. FIG. 4 thus shows the extreme position of the movable pulley block 14 when the attachment device 15 is arranged in its retracted storage position POS1. FIG. 5 shows the extreme position of the movable pulley block 14 when the attachment device 15 is arranged in its deployed working position POS2.

In addition, such a return device 10 includes a guide pulley 50 and a strap 57 for enabling the resilient return means 11 to apply traction force in the direction opposite to the travel direction of the attachment device 15. A free end 59 of the strap is secured to the movable pulley block 14 via a pivot arm 58 pivotally connected to the movable pulley block 14 to pivot about the second axis of rotation 24.

As shown in FIGS. 3 and 4, such an arrangement then enables the lengthening direction D1 of the resilient return means 11 to be oriented in a direction such that its orthogonal projection O1 onto a midplane of symmetry P1 of the aircraft 6 is oppositely directed relative to the orthogonal projection O2 of the travel direction D2 of the block 14 that is movable relative to the support structure 2 of the return device 10.

As shown in FIG. 6, the return device 10 may also include locking/unlocking means 51 enabling the movable pulley block 14 to be held in a locked position. Unlocking of the movable pulley block 14 may then advantageously take place automatically when the traction force on the line element 20 is greater than a threshold value F1.

Furthermore, such locking/unlocking means 51 may comprise:

a cam-follower wheel 52 pivotally connected on a rocker finger 53, where such a rocker finger 53 is arranged to pivot relative to the movable pulley block 14;

a resilient return element 54 stressed in twisting in both twisting directions as a function of the travel direction of the movable pulley block 14; and a cam ramp 55 secured to the support structure 2 of the return device 10 to enable a reaction force to be transmitted to the wheel 52 opposing the twist return force transmitted to the rocker finger 53 by the resilient return element 54.

Thus, such locking/unlocking means 51 also make it possible to brake or damp the pivoting movement of the movable pulley block 14 relative to the support structure 2 of the return device 10. The closer the movable pulley block 14 comes to its locked position, the greater the braking/damping force, thereby reducing its rate of pivoting until it becomes zero in the locked position.

Thus, the cam ramp 55 may advantageously have a slope with an angle of inclination that varies in non-linear manner.

Furthermore, the cam ramp 55 may include a point of inflection 56. In this way, the slope of the cam ramp 55 is inverted thus making it possible when the movable pulley block 14 is arranged in the locked position, for the rocker finger 53 to occupy a middle position in which it is not subjected to stress by the resilient return element 54.

Consequently, once the point of inflection 56 has been passed, the cam ramp 55 then exerts a reaction force on the wheel 52 that is negligible.

The traction force on the line element 20 needed for extracting the movable pulley block 14 from its locked position is then a function of the slope of the cam ramp 55 towards the point of inflection 56 and of the previously-selected twisting stiffness of the resilient return element 54.

Furthermore, in a second embodiment, as shown in FIG. 7, a return device 40 may include a movable pulley block 34 arranged with a slideway connection relative to the support structure 42 of the return device 40. Under such circumstances, the second axis of rotation 44 of the at least two pulleys 28-30 of the movable pulley block 34 is suitable for sliding so as to reduce or increase the distance between the first axis of rotation 43 of the at least two pulleys 25-27 of the stationary pulley block 33 and the second axis of rotation 44.

As above, such a return device 40 thus comprises resilient return means 41, a force-reduction member 32, and a line element 60 having a second free end 62 that is secured to the force-reduction member 32.

This return device 40 also advantageously includes a guide pulley 70 and a strap 77 for reversing the direction in which the resilient return means 41 deform relative to the longitudinal travel of the movable pulley block 34.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A return device for retracting an attachment device of an aircraft, the attachment device being movable between a retracted storage position and a deployed working position, the return device tending to place the attachment device in the retracted storage position in the absence of an external load, while allowing the attachment device to move towards the deployed working position in the presence of an external load, the return device comprising:

resilient return means for exerting a traction return force on the attachment device and automatically bringing the attachment device into the retracted storage position;

a force-reduction member for reducing the traction return force exerted by the resilient return means on the attachment device; and a line element having a first free end secured to the attachment device and a second free end secured to the force-reduction member;

wherein the force-reduction member comprises a pulley block that is stationary relative to a support structure of the return device and a pulley block that is movable relative to the support structure of the return device, each of the stationary pulley block and the movable pulley block having at least two independent pulleys, each having a degree of freedom to move in rotation, the at least two pulleys of the stationary pulley block being free to move in rotation about a first axis of rotation, and the at least two pulleys of the movable pulley block being free to move in rotation about a second axis of rotation, the first and second axes of rotation being parallel to each other, the at least two pulleys of the stationary pulley block and the at least two pulleys of the movable pulley block enabling the line element to be wound over the at least four pulleys so as to form at least two go paths and two return paths between the stationary and movable pulley blocks.

2. The return device according to claim 1, wherein the second free end of the line element is secured to the movable pulley block.

3. The return device according to claim 1, wherein the second axis of rotation of the movable pulley block is suitable for pivoting relative to the support structure of the return device, the movable pulley block forming a lever that pivots relative to the support structure of the return device about a third axis of rotation, the third axis of rotation being arranged parallel to the first axis of rotation and the second axis of rotation of the stationary pulley block and the movable pulley block respectively.

4. The return device according to claim 1, wherein the second axis of rotation of the movable pulley block is suitable for sliding relative to the support structure of the return device in a sliding direction that is perpendicular to the first axis of rotation and the second axis of rotation of the stationary pulley block and the movable pulley block respectively.

5. The return device according to claim 1, wherein the force-reduction member has a force reduction ratio from 2 to 10.

6. The return device according to claim 1, wherein the return device includes at least one guide pulley and a strap to enable the resilient return means to deform by lengthening along a direction for which the orthogonal projection onto a midplane of symmetry of the aircraft is oppositely oriented relative to the orthogonal projection onto the midplane of symmetry of a corresponding movement direction of the movable pulley block relative to the support structure of the return device.

7. The return device according to claim 1, wherein the return device includes locking/unlocking means for the movable pulley block, the locking/unlocking means enabling the movable pulley block to be held stationary automatically in a locked position corresponding to the retracted storage position of the attachment device.

8. The return device according to claim 7, wherein the locking/unlocking means comprise:
a cam-follower wheel mounted on a rocker finger, the wheel being pivotally connected relative to the rocker finger and the rocker finger being pivotally connected relative to the movable pulley block;
spring for exerting a twisting return force on the rocker finger and automatically returning the rocker finger into a middle rest position when the movable pulley block is arranged in the locked position; and
a cam ramp on which the cam-follower wheel runs during the movement of the movable pulley block relative to the support structure of the return device, the cam ramp being secured by an embedded type connection to the support structure of the return device and enabling a reaction force to be generated that acts on the rocker finger, the reaction force opposing the twisting return force exerted by the spring on the rocker finger.

9. The return device according to claim 7, wherein the locking/unlocking means release the movable pulley block from the locked position when a traction force is exerted on the line element that is greater than a threshold value.

10. The return device according to claim 8, wherein the cam ramp includes a varying degree of inclination enabling a non-linear reaction force to be generated that is exerted by the cam ramp on the rocker finger.

11. The return device according to claim 8, wherein the cam ramp includes a point of inflection for locally generating the reaction force exerted by the cam ramp on the rocker finger.

12. An aircraft having an attachment device enabling the aircraft to transport an external load, the attachment device being movable between a retracted storage position and a deployed working position, wherein the aircraft includes a return device according to claim 1 for retracting the attachment device into the retracted storage position in the absence of an external load, while allowing the attachment device to move towards the deployed working position in the presence of an external load.

13. A return device for retracting an attachment device of an aircraft, the attachment device being movable between a retracted storage position and a deployed working position, the return device tending to bias the attachment device towards the retracted storage position in the absence of an external load, while allowing the attachment device to move towards the deployed working position in the presence of an external load, the return device comprising:
a biasing member for exerting a traction return force on the attachment device to bias the attachment device towards the retracted storage position;
a force-reduction member for reducing the traction return force exerted by the biasing member on the attachment device; and
a link extending between and connecting the attachment device and the force-reduction member;
wherein the force-reduction member comprises a pulley block that is stationary relative to a support structure of the return device and a pulley block that is movable relative to the support structure of the return device, each of the stationary pulley block and the movable pulley block having at least two independent pulleys, each having a degree of freedom to move in rotation, the at least two pulleys of the stationary pulley block being free to move in rotation about a first axis of rotation, and the at least two pulleys of the movable pulley block being free to move in rotation about a second axis of rotation, the at least two pulleys of the stationary pulley block and the at least two pulleys of the movable pulley block enabling the line element to be wound over the at least four pulleys so as to form at least two go paths and two return paths between the stationary and movable pulley blocks.

14. The return device according to claim 13, wherein the first and second axes of rotation are parallel to each other.

15. The return device according to claim 13, wherein the link includes a second end secured to the movable pulley block.

16. The return device according to claim 13, wherein the biasing member comprises a spring.

17. The return device according to claim 16, wherein the biasing member comprises a coil spring.

18. The return device according to claim 14, wherein the second axis of rotation of the movable pulley block is suitable for pivoting relative to the support structure of the return device, the movable pulley block forming a lever that pivots relative to the support structure of the return device about a third axis of rotation, the third axis of rotation being arranged parallel to the first axis of rotation and the second axis of rotation of the stationary pulley block and the movable pulley block respectively.

19. The return device according to claim 14, wherein the second axis of rotation of the movable pulley block is suitable for sliding relative to the support structure of the return device in a sliding direction that is perpendicular to the first axis of rotation and the second axis of rotation of the stationary pulley block and the movable pulley block respectively.

20. The return device according to claim 19, wherein the force-reduction member has a force reduction ratio from 2 to 10.

* * * * *